Figure 1:
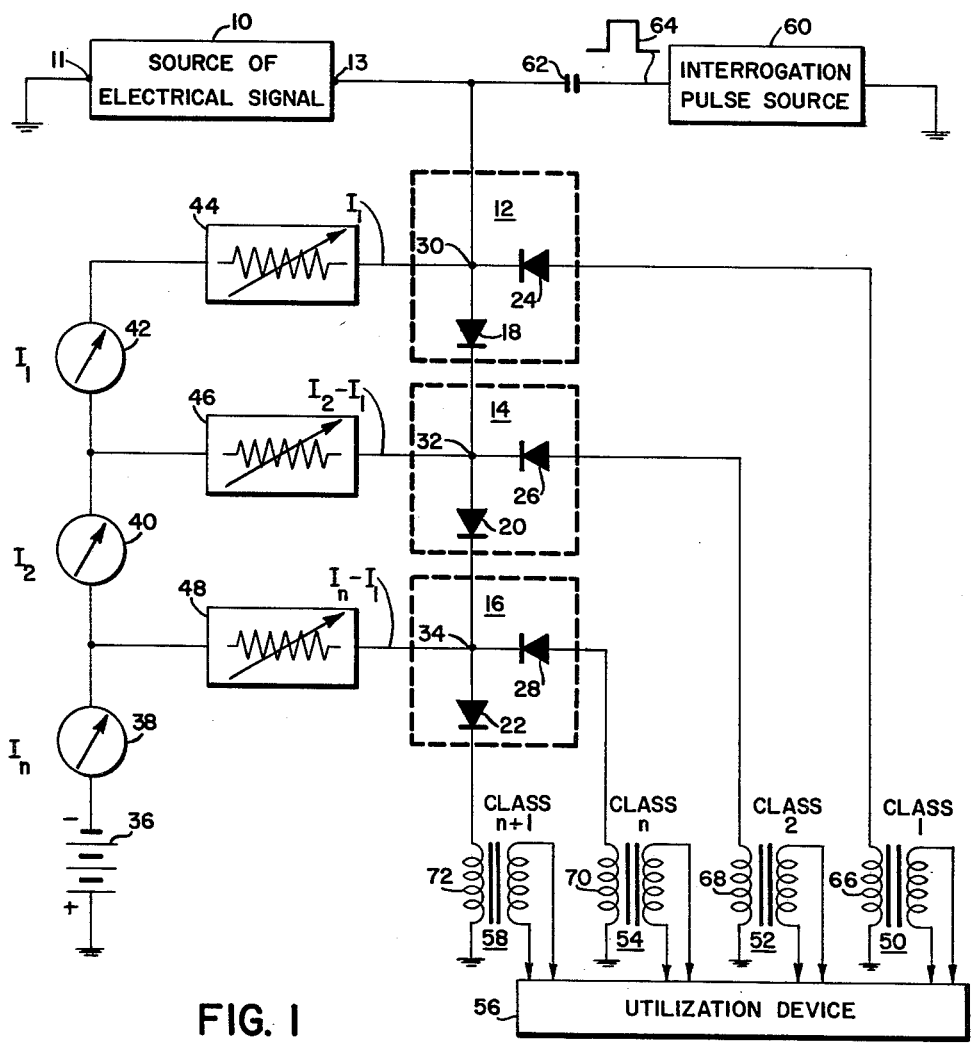

June 23, 1964   R. W. GILBERT   3,138,760
ELECTRICAL SIGNAL CLASSIFIER ACCORDING TO AMPLITUDE
Filed Sept. 18, 1961

INVENTOR
ROSWELL W. GILBERT
BY *C. A. Weigel, Jr.*
ATTORNEY

United States Patent Office 3,138,760
Patented June 23, 1964

3,138,760
ELECTRICAL SIGNAL CLASSIFIER ACCORDING TO AMPLITUDE
Roswell W. Gilbert, East Orange, N.J., assignor, by mesne assignments, to Daystrom Incorporated, Murray Hill, N.J., a corporation of Texas
Filed Sept. 18, 1961, Ser. No. 138,925
15 Claims. (Cl. 328—116)

This invention relates to apparatus for determining the amplitude of an electrical signal and, more particularly, to apparatus for classifying an electrical signal according to its amplitude.

In the field of industrial control it is often desirable to determine whether the amplitude of an electrical signal, which may be a function of temperature, thickness, pressure, etc., is within acceptable amplitude limits, is less than such limits, or is greater than such limits. For example, a conventional thickness gauge may provide a continuous electrical output signal representative of the thickness of a sheet of steel. It is often desirable in a rolling mill operation, for example, to maintain the sheet thickness within certain tolerance limits; i.e., within a class or range of acceptable thicknesses. Any thicknesses above or below this range of desired thicknesses are unacceptable. Depending upon whether the thickness of the steel sheet is above or below the acceptable range of thicknesses, conventional control circuitry may be energized to either increase or decrease the pressure of the rollers that are forming the sheet of steel. Alternatively, it is often desirable to continuously measure the thickness of a roll of steel sheet and classify the portions of the roll (which typically varies in thickness) according to their thickness.

Existing apparatus used to classify an electrical signal into classes, each typically encompassing varying ranges of amplitude, have been somewhat complex and hence relatively costly. For example, some systems have used full analog-to-digital conversion techniques and then digital computer techniques for classifying the digital representation of the electrical signal. Such systems are adequate, but unfortunately are quite costly.

Another difficulty with some existing electrical signal classifying apparatus is that it is unable to accurately classify signals having amplitude levels coinciding with maximum or minimum limits of an amplitude class. This tends to decrease the accuracy of the associated control system.

It is therefore an object of this invention to obviate the disadvantages of the prior art electrical signal classifiers.

Another object of this invention is to facilitate the classification of an electrical signal into amplitude ranges by relatively simple, yet precise, apparatus.

In a preferred embodiment of this invention, the apparatus for classifying an electrical input signal according to its amplitude includes a plurality of gating circuits. Each of the gating circuits has first and second diodes that are connected in series in their forward conducting direction. The second diodes of each gate are connected in series with each other, in their forward conducting direction, and the input signal is applied across such series connection. A plurality of sources of reference current, each connected to a different one of the gates, in combination with the input signal, act to selectively bias the first diode of only one of the several gates. An interrogation pulse, applied across the series string of second diodes, is gated through that one first diode corresponding to the amplitude class of the electrical input signal.

Figure 2:
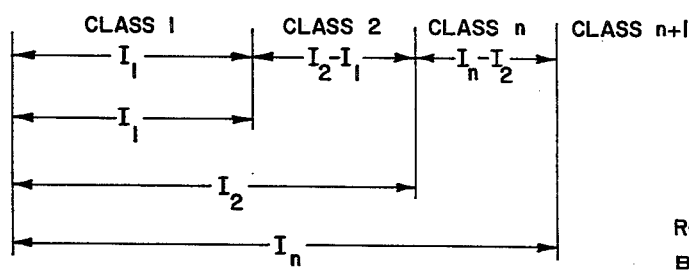

Further advantages and features of this invention will become apparent upon consideration of the following description read in conjunction with the drawing wherein:

FIGURE 1 is a schematic diagram of an electrical signal classifying apparatus constructed in accordance with this invention; and FIGURE 2 is a graph illustrating the relative amplitudes of the current flowing through the several branches of the electrical signal classification apparatus of FIG. 1 and the relationship of these several currents to the several amplitude classes.

In the drawing of FIG. 1, there is illustrated a source of electric signals 10 which, for example, may be an electrical current derived from a thermocouple indicative of temperature, or other electrical current signal indicative of some parameter such as pressure, motion, etc. One terminal, the negative terminal 11, of the source 10 is grounded. The electrical current from the other terminal, the positive terminal 13, of the source 10 is applied to the signal classification apparatus which includes a plurality of gates or stages 12, 14 and 16 corresponding respectively, to the classes, or amplitude ranges, into which it is desired to classify the amplitude of the electrical current. Each of the stages 12, 14, and 16, respectively, includes first unidirectional conducting means, or first diodes 18, 20 and 22, and a bypass unidirectional conducting means, or by-pass diodes 24, 26 and 28, respectively.

Each of the first diodes 18, 20 and 22 of the respective stages 12, 14 and 16 is connected in series with each other in the same conducting direction and in such polarity as to conduct, or pass, positive current (with respect to ground) from the source 10. The junctions 30, 32 and 34 between the respective diodes 18–24, 20–26, 22–28, of the several stages 12, 14 and 16 are connected to receive constant reference input currents $I_1$, $I_2-I_1$, and $I_n-I_2$, respectively. As will be described hereinafter, these reference currents establish the limits to the amplitude ranges defining the several classes into which the electrical signal from the source 10 is to be classified.

To establish these limits, the junction 30 of the first stage 12 is connected through a first variable impedance means 44 to a source of constant potential, illustrated as a battery 36. The positive terminal of the battery 36 is connected to ground. The negative terminal of the battery 36 is connected through indicating means, illustrated here as the serially connected first, second and third D.C. ammeters 42, 40 and 38, respectively, and the first variable impedance means 44 to the first stage junction 30. In like manner, the second stage junction 32 is connected through a second variable impedance means 46 to the battery 36. The current flowing through the second impedance means 46 to the second stage junction 32 is determined primarily by the value of a second variable impedance means 46, which is connected between the second stage junction 32 and the junction between ammeters 40 and 42 respectively. Lastly, the third stage junction 34 is connected through a third variable impedance means 48 to the battery 36.

The current indicated by meter 42 is designated $I_1$; the current indicated by meter 40 is designated $I_2$; and the current indicated by meter 38 is designated $I_n$. The relationship between the amplitude of these currents, the amplitude classes, and the range of signal amplitudes within each class is more easily understood by reference to FIG. 2. It may be seen that the amplitude of the current $I_1$ defines the amplitude gradation or limit between classes 1 and 2, the amplitude of the current $I_2$ defines the limit between classes 2 and $n$, the amplitude of the current $I_n$ defines the limit between classes $n$ and $n+1$. Since the total current passing through the battery 36 is $I_n$, the current passing through the third stage junction 34 is $I_n-I_2$. Similarly, the current passing through the second stage junction 32 is $I_2-I_1$, and the current passing through the first stage junction is $I_1$.

The anodes of the respective by-pass diodes 24, 26, and 28, which provide the output of each of the stages 12, 14 and 16, respectively, are respectively connected to ground through the primary windings of first, second and third pulse output transformers 50, 52, and 54. In like manner, the "bottom" of the series string of first diodes 18, 20, and 22 (the cathode of the first diode 22) is connected through the primary winding 72 of a fourth pulse output transformer 58 to ground. Each of the transformers 50, 52, 54, and 58 has a secondary winding which is connected to a utilization device 56. The utilization device 56 may be a suitable alarm device that might actuate a relay in the event a signal is derived from a particular one of the pulse output transformers 50, 52, 54, or 58.

An interrogation pulse source 60 is coupled through a coupling capacitor 62 and the series string of diodes 18, 20, and 22 and the primary 72 to ground. The pulse source generates an interrogation pulse 64 of positive-going polarity which is applied to the junction 30 of the first stage 12 and, hence, across the series string of diodes 18, 20 and 22.

For optimum operation, the first, second and third variable impedance means 44, 46 and 48, respectively, should provide resistance values as high as possible such that the several reference currents appear to be from pure current sources. Also, the several diodes employed in the stages 12, 14 and 16, respectively, should be selected to maintain a high impedance somewhat into the forward potential region of its current-voltage characteristic. Silicon diodes available commercially adequately meet this criterion. Desirably, the variable impedance means 44–46 and 48 should be adjustable, either manually, as by the hand adjustment of a variable tap on the resistor, or automatically as by the servo motor adjustment of a variable tap on a resistor under the control of a digital input signal, for example. A typical system suitable for varying these impedance values under the control of a digital input signal is described in U.S. Patent 2,738,504, issued to J. W. Gray, March 1, 1956. The system described in the Gray patent actuates a number of input relays by digital input signals to selectively connect resistors in parallel and in series with an input voltage source to obtain the desired output currents. Other conventional automatic techniques for varying the range limit defining currents may be used as desired.

The operation of the apparatus of the invention will be described with reference to both FIGS. 1 and 2. Thus, with the range limit defining currents as illustrated in FIG. 2, class 1 includes electrical currents having an amplitude range of 0 to $I_1$; currents having an amplitude less than the maximum $I_2$ but more than minimum of $I_1$ are within class 2; electrical currents having an amplitude less than the maximum $I_n$, but more than the minimum of $I_2$, are within class $n$, and currents having an amplitude greater than $I_n$ are in class $n+1$. These range limits or maxima and minima currents, of course, are adjustable by adjustment of the variable impedance means 44, 46, and 48 respectively.

If now it is assumed that the electrical current from the source 10 has an amplitude within the class 1 range, current flows from the electrical input signal source 10 through the first stage junction 30 and the first variable impedance means 44 to the battery 36. If the electrical input signal is not of sufficient amplitude to supply all of the constant $I_1$ reference, or range limit defining, current to the battery 36, the additional current is drawn through the by-pass diode 24 and the grounded primary winding 66 of transformer 50. The by-pass diode 24 is thus forward biased. Essentially none of the $I_1$ reference current flows through the first diode 18 of the first stage 12 since any such current would have to flow in its reverse conducting direction. The first series diode 18 is thus reverse biased and the by-pass diode 24 forward biased by the reference current $I_1$. Under these conditions the positive going interrogation pulse 64 from the interrogation pulse source 60 is blocked by the first series diode 18 but is allowed to pass in the reverse conducting direction through the forward biased, first by-pass diode 24 to the first pulse output transformer 50 and hence, to the utilization device 56. An output from the class 1 pulse transformer indicates, of course, that the input signal has an amplitude more than zero and less than $I_1$. As long as the amplitude of the interrogation pulse 64 is sufficiently small to not reverse bias the by-pass diode 24, the interrogation pulse 64 can pass to the output transformer 50.

If now it is assumed that the input current from the source 10 increases in amplitude so as to be within the class 2 range, i.e., more than $I_1$ but less than $I_2$, it is more than adequate to supply the constant current $I_1$ flowing through the impedance 44. The excess input current passes through the first series diode 18 of the first stage 12 in its forward conducting direction through the junction 32 of the second stage 14, and through the second variable impedance means 46 to the battery 36. In this instance, if the input current is not of sufficient amplitude to supply all of the constant reference current $I_2-I_1$, required by the second stage 14, the additional current is drawn through the second stage by-pass diode 26 and the primary winding 68 of the class 2 transformer 52. The second stage by-pass diode 26 is thus forward biased. Also, the second stage series diode 20 is reverse biased by the reference current $I_2-I_1$, drawing a very small reverse current therethrough. In like manner the first stage by-pass diode 24 is reverse biased by the input current. The interrogation pulse 64 now passes through the first stage series diode 18, the forward biased second stage by-pass diode 26, and the class 2 pulse transformer 52 to the utilization device 56.

A similar analysis of operation with greater amplitude input currents reveals that individual ones of the series diodes 18, 20 and 22 are forward biased when the sum of the upper (top of drawing) reference currents flowing through the several junctions 30, 32, 34 is smaller than the input current, and, conversely are reverse biased when the sum of the upper reference currents flowing through the several junctions 30, 32, 34 is greater than the input current, thereby transferring conduction to the appropriate one of the by-pass diode 24, 26, or 28. The interrogation pulse 64, applied to the string of series diodes 18, 20 and 22 progresses down through these series diodes to that stage 12, 14 or 16 whose series diode is reverse biased and whose by-pass diode is forward biased. The interrogation pulse then passes in the reverse conducting direction through the forward biased by-pass diode and its associated pulse output transformer to the utilization device 56.

The following diode schedule illustrates the conducting forward condition of the several diodes 18 through 28, inclusive, for different amplitude values of input currents that fall into the several classes 1, 2, $n$ and $n+1$.

|         | Class 1 | Class 2 | Class $n$ | Class $n+1$ |
|---------|---------|---------|-----------|-------------|
| Forward | 24      | 18, 26  | 18, 20, 28 | 18, 20, 22 |

When the input current has an amplitude within the highest $n+1$ class, the interrogation pulse 64 passes through the entire string of series diodes 18, 20 and 22 and through the $n+1$ output transformer 58 at the bottom of the string. For lower class levels the interrogation pulses are switched into the corresponding by-pass diodes 24, 26 and 28 of the several stages 12, 14 and 16. The several reference currents which determine the maximum and minimum current values for the several classes may be varied by the simple adjustment of the variable impedance means 44, 46 and 48, respectively, to vary the reference currents supplied to the several junctions. For example, if the value of the variable impedance means 44 is reduced so as to increase the amplitude of the reference current $I_1$, the class 1 range is increased since its upper maximum current value is increased.

The apparatus illustrated in FIG. 1, provides a nonambiguous classification of the electrical input signal when several conditions are met. Among these conditions are that the signal source and the reference current sources provide a pure current, i.e., from an infinite source impedance. Also, the diodes desirably should maintain a finite impedance somewhat into the forward potential region of their current-voltage characteristic. The amplitude of the interrogation pulse 64 should be lower in amplitude than the forward potential margin provided by the diodes selected. Further, the rate of change of the input signal should be sufficiently slow as to not generate spurious asynchronous pulses as the several diodes switch from a state of conduction to non-conduction and vice versa. This latter condition, however, may be overcome by gating the output signals to the utilization device 56 by conventional gating techniques. When these criteria are satisfied, the apparatus of FIG. 1 will operate such that diode conduction transfers from series to by-pass diodes and vice versa abruptly, in response to an increment of current difference at the zone boundary level. Depending upon the accuracy required, these criteria may be considerably relaxed and still provide quite satisfactory operation.

In an alternative arrangement of the invention, the several meters 38, 40 and 42 may be placed individually in series between the several variable impedance means 44, 46, and 48, respectively, and the corresponding junctions 30, 32 and 34. In this manner the meters 38, 40 and 42 indicate directly the width of the several amplitude classification ranges, i.e., $I_n-I_2$, $I_2-I_1$, and $I_1$ rather than the zone maxima and minima, i.e., $I_1$, $I_2$, and $I_n$. The particular placement of the meters 38, 40 and 42, however, is purely a matter of choice. The polarity of the diodes, the interrogation pulse 64, and that of the battery 36 may be reversed to receive and classify input current signals of negative-going polarity. Also voltage input signals may be classified simply by placing a resistor in series between the source 10 and the first junction 30 as to convert the voltage to a current.

There has thus been described a relatively simple electrical signal classifier. The system herein described is designed to receive an electrical current as an input signal, and to classify the signal into classes defined by reference currents corresponding to the desired maxima and minima amplitudes of each class, upon interrogation by a pulse. The system routes the interrogation pulse into one of several output circuits corresponding to the several classes. The maxima and minima amplitudes of each class are adjustable by manual or automatic techniques and provide a relatively nonambiguous response to signals having levels occurring at the class maxima and minima levels.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. Apparatus for classifying an electrical signal according to its amplitude into one of a plurality of amplitude defining classes comprising in combination, a plurality of gating circuits each including first and second unidirectional conducting means having a forward conducting direction, said first and said second unidirectional conducting means in each of said gates being connected in series in said forward conducting direction, each of said second unidirectional conducting means being connected in series with each other in said forward conducting direction, means coupling said input electrical signal across said series connected second unidirectional conducting means, and means including a plurality of sources of reference current each connected to a different one of said gating circuits and responsive to the amplitude of said input signal for selectively forward biasing said first unidirectional conducting means of only one of said gates depending of the magnitude of said signal, thereby to classify said electrical signal in accordance with the amplitude of said sources of reference current.

2. Apparatus for classifying an input electrical signal according to its amplitude into one of a plurality of amplitude defining ranges comprising in combination, a plurality of gating circuits, each including first and second diodes having a forward conducting direction, said first and second diodes in each of said gates being connected in series in said forward conducting direction, each of said second diodes being connected in series with each other in said forward conduction direction, means responsive to said input signal for applying said input signal across said series connected second diodes, means including a plurality of sources of reference current each coupled to different ones of the junctions between said series second diodes for selectively forward-biasing said first diode of one of said gates depending of the magnitude of said signal, thereby to classify said input signal into said amplitude ranges in accordance with the amplitudes of said sources of reference current, and means including a source of interrogation pulses connected to one of said gates for passing an output pulse through said forward biased diode, thereby to provide an indication of the amplitude range of said input signal.

3. The apparatus set forth in claim 2 wherein each of said sources of reference current is variable in amplitude to vary the maxima and minima of the amplitude defining ranges.

4. The apparatus set forth in claim 2 wherein each of said sources of reference current is substantially a constant current source.

5. The apparatus set forth in claim 2 wherein the said diodes have a finite impedance in at least a portion of their forward conducting region, thereby to allow the passage of said interrogation pulse through said forward biased first diode.

6. Apparatus for classifying an input current into one of a plurality of amplitude defining classes comprising, in combination, a plurality of gating circuits, each including first and second diodes having a forward conducting direction, each of said diodes having a finite impedance in at least a portion of its forward conducting region, the diodes of each of said gates being connected in series in said forward conduction direction, said second diode in each of said gates being connected in series with each other in said forward conducting direction, means responsive to said input current for coupling said input current across said series connected second diodes, means including a plurality of sources of reference current each coupled to different ones of the junctions between said second diodes for selectively forward biasing said first diode of one of said gates depending on the magnitude of said signal, thereby to classify said input current into classes defined by the amplitude of said sources of reference current, means including a source of interrogation pulses connected to one of said gates for passing an output pulse through said one forward biased diode thereby to provide an indication of the classification of the amplitude of said input current, and means for varying the amplitude of one of said sources of reference current thereby to vary the maxima or minima amplitude limits of said classes.

7. Apparatus for classifying an input signal according to its amplitude into one of a plurality of amplitude ranges comprising, in combination, a plurality of diodes connected in series, each of said diodes being poled in the same conducting direction, means connected to at least one of said diodes for applying said input signal across said series connected diodes, a plurality of sources of reference current each connected to a different one of the junctions between said diodes, a plurality of output circuit means each connected to a different one of said junctions, each of said output circuit means including a by-pass diode poled to pass said reference current from the particular one of said sources that is connected to that junction, whereby only one of said by-pass diodes conducts depending upon the amplitude of said input signal, and interrogation pulsing means connected across said series diodes for passing an interrogation pulse through that one of the by-pass diodes that is conducting thereby to classify said input signal according to the amplitude of said reference current sources.

8. Apparatus for classifying an input signal according to its amplitude into one of a plurality of amplitude ranges comprising, in combination, a pair of input terminals, means responsive to said input signal for applying said input signal across said input terminals, a plurality of first diodes connected in series in the same conducting direction between said input terminals, a corresponding plurality of constant current sources, a plurality of by-pass diodes each having forward and reverse conducting directions and each being connected to a different one of the junctions between said series diodes, means responsive to said constant current sources for forward biasing certain ones of said first diodes in accordance with the amplitude of said input signal, a source of interrogation pulses, means responsive to said source for applying said interrogation pulses across said input terminals in such polarity as to normally reverse-bias said by-pass diodes, means responsive to said forward biased first diodes and to said constant current sources for forward biasing only one of said by-pass diodes in accordance with the amplitude range of said input signal thereby to pass said interrogation pulses, whereby said interrogation pulse provides an indication as to the amplitude range of said input signal.

9. An electrical signal classifier for classifying an input current according to its amplitude comprising, in combination, means for receiving said input signal, a first, second and third pulse responsive means, a first and a second unidirectional conducting means connected in series in the order named between said input signal receiving means and said third pulse responsive means, a first junction between said first unidirectional conducting means and said input signal receiving means, a third unidirectional conducting means connected between said first pulse responsive means and said first junction, said third unidirectional conducting means being poled in the same direction as said first and second unidirectional conducting means, a second junction between said first and second unidirectional conducting means, a fourth unidirectional conducting means connected between said second pulse responsive means and said second junction, said fourth unidirectional conducting means being poled in the same direction as said second unidirectional conducting means, first and second reference current sources connected respectively to said first and second junctions, interrogation pulse means connected to said first junction for providing a pulse signal of the same polarity as said input signal, whereby said interrogation pulse passes through one of said first, second or third pulse responsive means as determined by the relative amplitude of said input signal and said reference current sources.

10. The signal classifier set forth in claim 9 which also includes means for varying the current supplied by said first and second current sources.

11. A signal classifier for classifying an input signal into amplitude defining classes comprising, in combination, means adapted to receive said analog signal, first and second output circuits, a first unidirectional conducting means having a forward conducting direction connected between said input signal receiving means and said second output circuit, means including a source of reference current corresponding in amplitude to the limits defining said amplitude classes for reverse biasing said first unidirectional conducting means, a second unidirectional conducting means connected to the junction between said input signal receiving means and said first unidirectional conducting means, and means including an interrogation pulse source for passing an output pulse to said first or second output circuits depending upon whether said input signal is greater or less in amplitude than said reference current source.

12. A signal amplitude classifier for classifying an input signal according to amplitude comprising, in combination, means adapted to receive said input signal, first and second classifying circuits, a source of reference current, each of said first and second classifying circuits connected in parallel across said source each of said classifying circuits including a resistor and a diode connected in series, each of said diodes having a forward conducting direction and being poled to pass current in said forward conducting direction from said reference current source, means coupled to said receiving means for applying said input signal across the junctions between said resistor and each said diode, biasing means connected between said junctions and responsive to the amplitude level of said input signal for forward biasing only one of said diodes, and interrogation pulse means coupled to said first junction for passing an interrogation pulse through said one forward biased diode.

13. A circuit for classifying an electrical input signal according to its amplitude comprising, in combination, a plurality of substantially constant current sources, a corresponding plurality of diodes connected in series in the same forward conducting direction, each of said series connected diodes being connected between a different pair of said constant current sources, means including said input signal for forward biasing one or more of said diodes in accordance with the relative amplitude of said input signal and the cumulative amplitude said constant current sources, a plurality of output circuit means for providing an output signal on one of said output circuit means in accordance with the amplitude of said input signal, each of said output circuit means including a diode having a reverse conducting direction poled so as to prevent the passage of an input signal, and interrogation pulse means for passing an output pulse through one of said output diodes in said reverse conducting direction.

14. In combination: a first terminal and a second terminal, a source of input current having a first polarity and connected between said first and second terminals, first, second and third diodes connected in series between said first and second terminals, each of said diodes being connected to be forward biased by said first polarity input current, a first junction between said first and second diodes, a second junction between said second and third diodes, means including a source of current connected to said second terminal for causing constant current to flow through said first terminal and each of said first and second junctions of a polarity opposite to said first polarity, and first, second and third by-pass diodes each connected between said second terminal and a different one of said first and second junctions and said first terminal, each of said by-pass diodes being connected to be reverse biased by said input current, thereby to forward bias only one of said by-pass diodes depending upon the relative amplitudes of said input current and said constant currents.

15. In combination: a first terminal and a second terminal, a source of input current having a first polarity and connected between said first and second terminals, first and second diodes connected in series between said first and second terminals, each of said diodes being connected to be forward biased by said first polarity input current, a first junction between said first and second diodes, means including a source of current connected to said second terminal for causing constant currents to flow through said first terminal and said first junction of a polarity opposite to said first polarity, and first and second by-pass diodes each connected between said second terminal and a different one of said first terminal and said first junction, each of said by-pass diodes being connected to be reverse biased by said input current, thereby to forward bias only one of said by-pass diodes depending upon the relative amplitudes of said input current and said constant currents.

References Cited in the file of this patent

UNITED STATES PATENTS 2,946,010    Tarczy-Hornoch _____ July 19, 1960

OTHER REFERENCES

IBM Technical Disclosure Bulletin, vol. 3, No. 1, June 1960, page 61.